W. T. CARTER.
COASTER BRAKE.
APPLICATION FILED JUNE 11, 1912.

1,118,889.

Patented Nov. 24, 1914.

Witnesses.
Frank Waterfield

Inventor.
Walter T. Carter.
by
Attorney.

UNITED STATES PATENT OFFICE.

WALTER T. CARTER, OF LOS ANGELES, CALIFORNIA.

COASTER-BRAKE.

1,118,889.  Specification of Letters Patent.  Patented Nov. 24, 1914.

Application filed June 11, 1912. Serial No. 702,990.

*To all whom it may concern:*

Be it known that I, WALTER T. CARTER, a citizen of the United States, residing at the city of Los Angeles, in the county of Los Angeles and State of California, have invented new and useful Improvements in Coaster-Brakes, of which the following is a specification.

The object of my invention is to simplify the construction of coaster brakes for bicycles.

Figure 1:
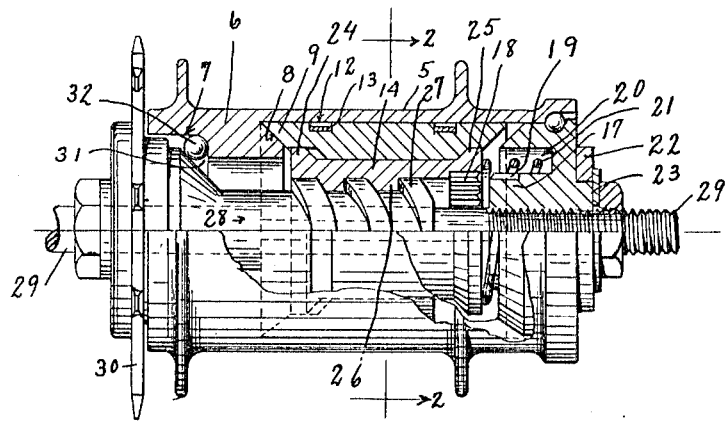
Figure 2:
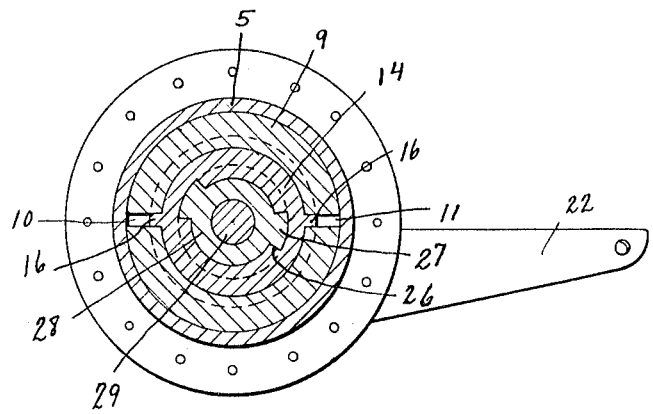

My construction is described herein and illustrated in the accompanying drawings forming a part hereof in which;

Figure 1 is a side elevation of the hub of a bicycle wheel equipped with my brake, some of the parts being partly in section. Fig. 2 is a cross section on the line 2—2 of Fig. 1.

In the drawings 5 is the outer shell of the hub of the driving wheel of a bicycle which is provided with an inwardly projecting annular flange 6, the outer portion 7 of which provides a portion of the ball race of the wheel. In the inner edge of the flange is a V-shaped groove which forms the inner edge 8 of the flange into a brake shoe expander. The outer edge of the annular brake shoe 9 is reecived in this groove and is expanded by the tapered expander into frictional engagement with the body of the hub. This brake shoe is formed in parts, preferably two, which are slightly separated at 10 and 11 when in their expanded position as shown in the drawings. Near each end of the brake shoe are external grooves 12 in which are mounted springs 13 which hold the parts of the shoe in spring tight engagement with the shoe operating spool 14. At each end the brake shoe is internally beveled. Between the parts of the brake shoe are received the longitudinal external ribs 16 of the spool 14 which prevents the brake shoe from rotating on the spool. Spool 14 has on the inner circumference adjacent brake gear 17, teeth 18 which when the spool is moved into a braking position slide upon and engage teeth 19 cut on the inner end of the brake gear. An annular groove 20 is cut in the end of the brake gear just outside teeth 19 and in this groove is mounted a coil spring 21 which normally holds the spool slightly spring pressed away from the gear. A brake lever 22 is mounted upon the shank 23 of the brake gear 17. The outer end of this lever is secured to the frame of the machine when the brake is positioned for use. Spool 14 has inwardly tapered outwardly projecting flanges 24 and 25 which may be termed the braking and driving flanges respectively, and for half its length has an interior double screw thread 26 into which is received the screw thread 27 of sleeve 28 which sleeve is loosely mounted on axle 29 of the machine. The outer end of sleeve 28 is enlarged and carries sprocket wheel 30 upon which the driving chain of the machine (not shown) works. This enlarged end forms a part of ball race 31 in which are carried balls 32. I have shown the sections of the brake sleeve separated by ribs but it is not necessary that all the sections be so separated. If two sections are separated by a rib it is sufficient as it will prevent the rotation of the sleeve.

In the operation of my brake the same is placed upon a bicycle in the usual manner. When the operator desires to drive his machine he pedals forward which causes sleeve 28 to revolve in the direction which draws the brake shoe toward the sprocket wheel thereby expanding the shoe and locking it by frictional contact with and to the hub. If he desires to coast he stops pedaling. The momentum acquired causes the wheel to unscrew the brake shoe or cause it to travel away from the sprocket wheel thereby releasing it from its frictional engagement with the hub. If he desires to brake the wheel he back pedals which causes sleeve 28 to move spool 14 and the brake shoe away from the sprocket until the teeth on the shoe engage the teeth on the brake gear 17. The spool moves a littel farther and expands the brake shoe into frictional engagement with the hub and the movement of the wheel is retarded according to the force and amount of backpedaling employed. Whenever spool 14 is moved in either direction it moves the brake shoe a short distance before the flanges on the spool expand the shoe. During this movement the springs on the outside of the shoe draw the parts of the shoe closer together.

Having described my invention what I claim is;

1. A coaster brake comprising an axle; a brake gear rigidly mounted thereon, said gear having teeth on the inner end thereof; means to hold said gear against rotation; a sleeve loosely mounted on said axle, said sleeve being externally threaded a portion of its length; a sprocket wheel on the end of said sleeve; a spool mounted on said sleeve in threaded contact therewith, said spool having external tapered flanges at the ends thereof and a longitudinal rib and teeth in end end thereof; an annular expandible brake shoe slidably but non-revolubly mounted on said sleeve, said shoe being internally beveled; and an outer shell provided near one end thereof with an inwardly projecting expanding flange, said shell forming the outer portion of the hub.

2. A coaster brake comprising a hub having an outer shell provided near one end with an inwardly projecting expanding flange; an annular expandible brake shoe within said shell longitudinally divided, the ends of said shoe being tapered outwardly; an annular spool within said shoe, said spool having a rib that enters between the parts of the shoe and having expanding flanges at the ends thereof and an interior thread and interior teeth at the braking end thereof; an axle; an annular spool operating screw on said axle in threaded engagement with said spool; a sprocket wheel on one end of said screw; a brake gear having a tapered end mounted on the axle within the shell, said gear having an annular groove in the tapered end and teeth adapted to be engaged by the teeth of the operating screw; a coiled spring in the groove in the brake gear; and a lever mounted on said brake gear.

In witness that I claim the foregoing I have hereunto subscribed my name this first day of June, 1912.

WALTER T. CARTER.

Witnesses:
 FRANK WATERFIELD,
 G. E. HARPHAM.

Copies of this patent may be obtained for five cents each, by addressing the "Commissioner of Patents, Washington, D. C."